United States Patent Office 2,711,053
Patented June 21, 1955

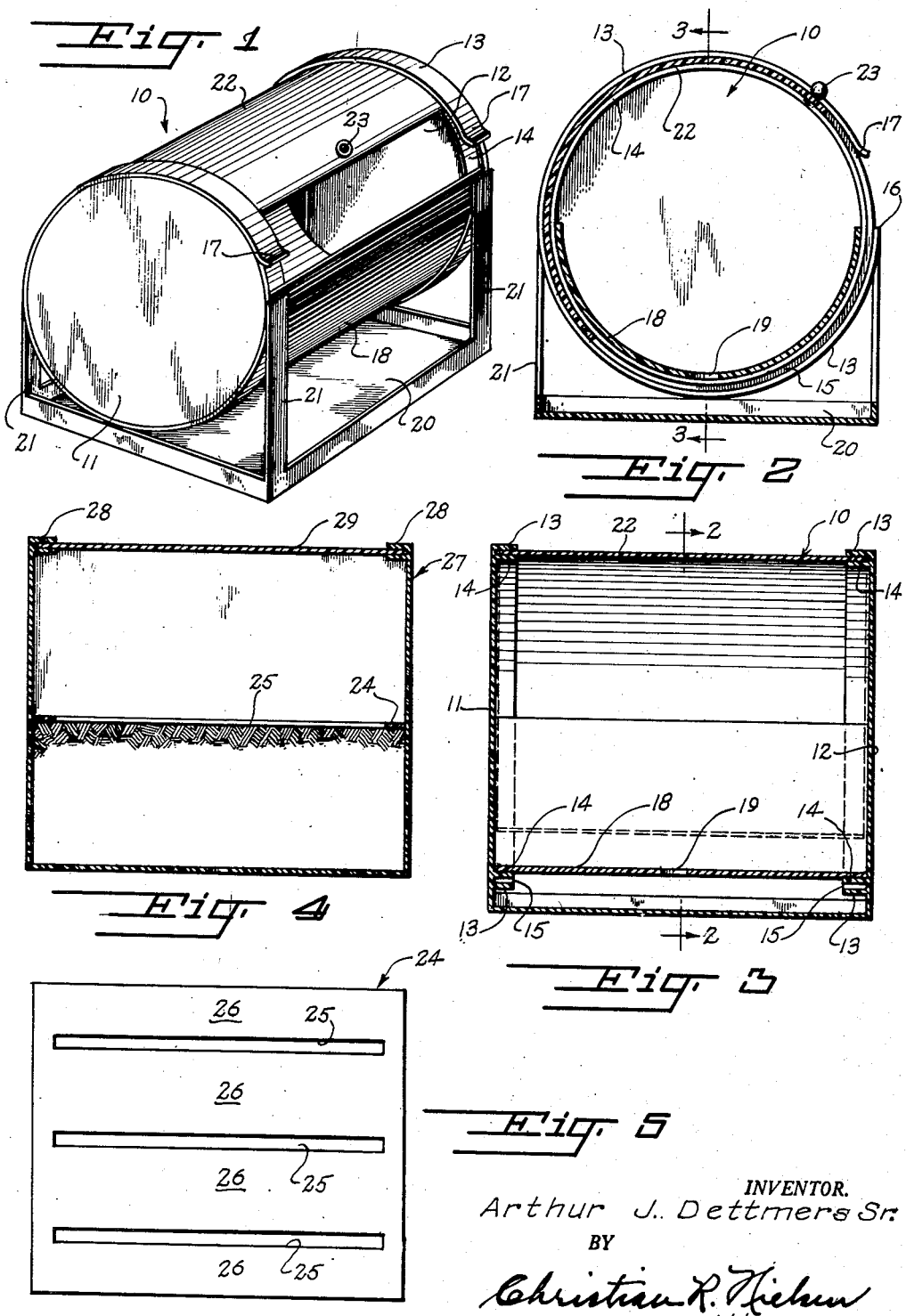

2,711,053

PROPAGATING DEVICE FOR SEEDS, PLANTS AND CUTTINGS

Arthur J. Dettmers, Sr., Gambrills, Md.

Application June 15, 1954, Serial No. 436,959

1 Claim. (Cl. 47—19)

This invention relates to plant husbandry, and more particularly to a green house or like construction, and it consists in the constructions, arrangements and combinations herein described and claimed.

It is the cardinal object of the invention to provide a transparent housing for reception of soil in which plants, seeds and clippings may be planted, said housing having a slidable closure for adjusting the moisture content within the housing, as well as to regulate the temperature within the housing, thereby providing ideal growing conditions for the plants, seeds or clippings within the housing.

It is a further object of the invention to provide a device for propagation of seeds, plants and clippings in which the climatic conditions within the housing may be manually controlled and thus effect a more speedy growth of the plants, seeds or clippings.

It is a still further object of the invention to provide a propagation device for seeds, plants and cuttings which may be used indoors as well as outdoors, there being means for controlling the climatic conditions within the device as well as to protect the plants against the entrance of insects.

It is an additional object of the invention to provide a propagating device which can be readily constructed from transparent plastic materials, which allows penetration of infra-red and ultra-violet rays of sunlight which are beneficial to the growth of the plants.

Additional objects, advantages and features of invention will be apparent from the following description, considered in conjunction with the accompanying drawing, wherein, Figure 1 is a perspective view of the propagation device.

Figure 2 is a cross section on the line 2—2 of Figure 3,

Figure 3 is a cross section on the line 3—3 of Figure 2.

Figure 4 is a vertical section of a modified construction of the device, and

Figure 5 is a top plan view of a template employed when it is desired to plant seeds in rows within the propagators.

There is shown a seed, plant and cuttings propagator device 10 formed from suitable transparent plastic materials, which in the forms shown in Figures 1 to 3, is of elongated cylindrical form, although such shape is not arbitrary.

In the present instance, the device consists of a pair of circular end walls 11 and 12 which, as clearly shown in Figure 3, are formed with a pair of spaced annular flanges 13 and 14, adjacent the outer periphery of the end walls, the flanges being arranged in opposed relation to provide an annular guide or trackway 15. The outer flange 13 terminates or is interrupted at a point 16, while the opposite end 17 of the flange 13 is given an outward curvature for a purpose presently to be explained.

A semi-circular bottom wall 18 is secured between the end walls 11 and 12, the upper edges of said wall terminating on a medial line through the longitudinal axis of the device. Thus an open trough is presented into which a suitable earth may be deposited. For drainage purposes the wall 18 is formed with one or more openings 19.

A combined support and seepage tray 20 is employed which as shown is of rectangular form, having upright struts 21 spaced so as to contact the periphery of the flanges 13 to which they are suitably secured.

A semi-circular closure 22 is employed of such dimensions as to be slidably positioned in the tracks 15 of the end walls 11 and 12, the end 17 of the flange 13 functioning to permit entrance of the closure member between the flanges 13 and 14. The closure 22 may be of rigid material and suitably shaped to follow the trackway 15, or may be of a flexible character, and is provided with a knob 23 for readily adjusting the same to regulate the degree of opening above the bottom wall or trough 18.

In use, the earth is deposited in the trough defined by the bottom and end walls, the earth being leveled off so as to present a smooth surface. Seeds, clippings or other vegetation which it is desired to propagate is deposited or planted in the earth which is then watered. The closure 22 may be moved to its full or partially closed position depending upon the climatic conditions required for the seeds or plants which are planted. For instance, African violets and their leaves require a substantial amount of moisture when first planted, and the closure may be fully closed for a period of time so as to develop a humid condition within the housing. The device being transparent, infra-red and ultra-violet rays of the sun may penetrate the housing and the seeds or plants thus derive the benefit thereof.

When seeds are planted, it is desirable to plant them in rows, since the plants may be more readily removed for transplanting, and also, plants arranged in rows provide a more attractive appearance. In the present instance, a template 24 as shown in Figure 5 is employed. The template 24 is formed from sheet material, and may be plastic if desired, of such dimensions as to fit within and upon the earth deposited in the trough, defined by the wall 18. Preferably the soil is first moistened and then the template is positioned thereon.

The template 24 is formed with a series of slots 25, these slots being separate so as to provide surfaces 26 upon which the seed may be supported for the time being. If the seed required a hallow furrow, a pointed instrument may be passed along the slots, and the seed supported upon the surfaces 26 are then moved into the furrows. With the seed in the furrows additional soil is employed to cover the seed. The template is then removed.

In the modified form of the device, as shown in Figure 4, the propagator 27 is in the form of a rectangular plastic housing having an open top. The open top of the housing is formed with a pair of opposed slots or trackways 28 for slidably receiving a transparent plastic closure 29, the closure being freely movable through either end of the housing. This particular type of propagator is especially useful in planting seeds, and as shown, the template 24 is positioned upon the top surface of the soil for positioning the seeds within the slots.

While I have shown an described preferred forms of the device, this is by way of illustration only, and I consider as my own all such modifications in construction as fairly fall within the scope of the appended claim.

I claim:

A propagating device for seeds and vegetation comprising a transparent housing having a base and end walls, a semi-circular open trough above said base and secured between said end walls, a circular trackway on said end walls in opposed relation, a transparent flexible closure disposed between said trackways and movable annularly about said trough to a position therebeneath and cooperating with the upper edges of the trough to close or partially close the open top thereof, said trackways comprising spaced inner and outer flanges, the outer flange being interrupted to define a passage-way for initial insertion of said flexible closure, said base including a continuous upstanding flange and said trough being provided with a drainage opening.

References Cited in the file of this patent

UNITED STATES PATENTS

| | | |
|---|---|---|
| 94,169 | Jillson | Aug. 24, 1869 |
| 95,255 | Osborn | Sept. 28, 1869 |
| 1,000,179 | Kamenstein | Aug. 8, 1911 |
| 1,372,995 | Eckart | Mar. 29, 1921 |
| 1,405,568 | Conklin | Feb. 7, 1922 |
| 1,580,287 | Colle et al. | Apr. 13, 1926 |
| 1,912,300 | Parks | May 30, 1933 |
| 2,465,227 | Heatley | Mar. 22, 1949 |
| 2,526,313 | Zaroban | Oct. 17, 1950 |
| 2,639,551 | McKee | May 26, 1953 |
| 2,667,285 | Misch | Jan. 26, 1954 |